(12) United States Patent
Puckett et al.

(10) Patent No.: US 10,134,426 B1
(45) Date of Patent: Nov. 20, 2018

(54) TONE ARM HOLDER

(71) Applicant: InMusic Brands, Inc., Cumberland, RI (US)

(72) Inventors: Scott Puckett, Pawtucket, RI (US); Alex Souppa, Ashland, MA (US); Carl Barton, Mapleville, RI (US); John O'Donnell, Fort Lauderdale, FL (US)

(73) Assignee: inMusic Brands, Inc., Cumberland, RI (US)

( * ) Notice: Subject to any disclaimer, the term of this patent is extended or adjusted under 35 U.S.C. 154(b) by 0 days.

(21) Appl. No.: 15/641,489

(22) Filed: Jul. 5, 2017

(51) Int. Cl.
  *G11B 3/10* (2006.01)
  *G11B 3/09* (2006.01)
(52) U.S. Cl.
  CPC ............... *G11B 3/10* (2013.01); *G11B 3/092* (2013.01)
(58) Field of Classification Search
  None
  See application file for complete search history.

(56) References Cited

U.S. PATENT DOCUMENTS

| | | | | |
|---|---|---|---|---|
| 2,998,255 A | * | 8/1961 | Pfundt | G11B 3/08 369/257 |
| 4,346,465 A | * | 8/1982 | Dennis | G11B 3/08545 369/225 |
| 4,734,902 A | * | 3/1988 | Dennis | G11B 3/085 369/176 |

FOREIGN PATENT DOCUMENTS

GB          2057756 A  *  4/1981  ......... B60H 1/00428

* cited by examiner

*Primary Examiner* — William J Klimowicz
(74) *Attorney, Agent, or Firm* — Barlow, Josephs & Holmes, Ltd.

(57) ABSTRACT

The tone arm holder includes a saddle with a hook portion that defines an open end. A resilient dividing member is located on the top surface of the saddle. The space between the resilient dividing member and the hook define a lock seat configured and arranged for frictional engagement, receipt and storage of a tone arm therein. The opposing side of the saddle from the resilient member defines a performance seat configured and arranged for freely supporting a tone arm whereby a tone arm may be placed on and removed from the performance seat without frictional engagement of the tone arm to the holder. The tone arm is freely movable between the performance seat at a first position and the lock seat at a second position by traversing across the resilient dividing member by exceeding the resilient force of the resilient dividing member.

6 Claims, 14 Drawing Sheets

TONE ARM HOLDER

CROSS REFERENCE TO RELATED APPLICATION

N/A

BACKGROUND OF THE INVENTION

The invention related generally to vinyl turntables with tone arms. More specifically, the present invention relates to an improved holder for tone arms.

Tone arms and holders therefor are very well known in the art. Tone arms are typically elongated members that include some type of needle or cartridge on the free end thereof to interface with a vinyl record to, in turn, transmit, sound to the electronic components of the turntable for further sound processing and output. Such tone arms and the function thereof are very well known in the art.

Tone arms can be of many different configurations and shapes, such as straight or curved. When the tone arm is in use, it is pivotally placed over the vinyl record to be played and then lowered into place on the vinyl record. When not in use, it is exceedingly common for a tone arm to be pivotable away from the rotating platter with vinyl thereon to some type of storage location, typically in the form of a tone arm holder with a clip. These known tone arm holders are fixed to the turntable surface and include a saddle to receive the body portion of the tone arm. This saddle has an open configuration so that the tone arm body portion can simply be rested on the saddle. The open saddle enables the tone arm to be quickly temporarily placed on and then removed quickly and easily therefrom for use to play a record.

However, there is a need to be able to secure the tone arm in place on the holder when it is not in use to protect the delicate tone arm assembly. For example, there is a particular need to secure the tone arm in place when the turntable is transported or when the turntable will not be used for an extended period of time.

To address the need to lock the tone arm in place, there have been many attempts in the prior art. As shown in FIGS. 1-4, one common prior art tone arm holder 10 uses a plastic saddle 12 to rest the tone arm 14 in when easy access to the tone arm 14 for use is required along with a pivoting plastic clip 16 to snap over and secure the tone arm 12 in place in the plastic saddle 12. A very well-known Technics SL1200 uses such a prior art tone arm holder 10 and pivoting clip 16.

In FIG. 1, a close-up perspective view of the prior art plastic tone arm holder 10 in a closed position is shown to include a saddle 12 that is fixed to a turntable 24 itself, typically, to a tone arm base 18 via a typically threaded mounting post 20. A saddle 12 with a single seat 12a is provided with an upstanding post 22 that pivotally receives a clip member 16 about a pivot pin 24. FIG. 2 shows the prior art tone arm holder 10 mounted on a turntable 24 when the tone arm 14 is in use during a performance. The clip portion 16 is pivoted open in preparation of receiving the tone arm 14. In FIG. 3, the tone arm 14 is resting on the single seat 12a of the saddle 12 of the tone arm holder 10 when the tone arm 14 is not in use. Referring now to FIG. 4, the clip portion 16 of the prior art tone arm holder 10 is pivoted counterclockwise, as shown by the arrow, so that the free end of the clip portion 16 rides over the tone arm 14, which may be tubular, so that it may snap into place. The flexibility of the clip portion 16 enables it to ride over the tone arm 14 so that locking can be achieved, as seen in FIG. 4.

Thus, the prior art provides a saddle 12 with a single location seat position that receives the tone arm 14. To better secure the tone arm 14, while in the same seat location, the clip 16 is pivoted over the tone arm 14 to thereby lock it in same location.

This prior art tone arm holder 10 with clip 16 suffers from many disadvantages. First, the plastic pivoting clip 16 is weak in construction and, therefore, has a tendency to break over time. Therefore, such clips 16 or even the entire prior art tone arm holder 10 need to be frequently replaced over the life of the turntable.

Also, these configurations of known tone arm holders 10, with pivoting clip 16, suffer from being inefficient to use, particularly by operators, such as disc jockeys (DJs), that frequently move the tone arm 14 between a play/performance position to a resting position and also travel frequently with the turntable. Thus, it is important to be able to quickly rest the tone arm 14 in place on a holder when not in use and then be able to quickly remove it from the holder for use. There is also a need for an operator of a turntable 24 to be able to quickly move the tone arm 14 to a locked resting position. There is also a need for an operator of a turntable 24 to be able to quickly move the tone arm 14 between a locked and unlocked condition on the holder. Therefore, when in use, the operator will want to use the saddle without the lock to have easy access to move the tone arm 14. When not in use, the tone arm 14 needs to be easily and quickly lockable to secure the tone arm 14 during transport or in a simple rest non-use or non-performance condition.

SUMMARY OF THE INVENTION

The present invention preserves the advantages of prior art vinyl turntables with tone arms and holders for such tone arms. In addition, it provides new advantages not found in currently available tone arm holders and overcomes many disadvantages of such currently available tone arm holders.

The invention is generally directed to the novel and unique holder for a tone arm with a new and novel two-position saddle that defines an open use/performance position and a locked position. The tone arm holder includes a saddle with a hook portion that defines an open end. A resilient dividing member is located on the top surface of the saddle. The space between the resilient dividing member and the hook define a lock seat configured and arranged for frictional engagement, receipt and storage of a tone arm therein. The opposing side of the saddle from the resilient member defines a performance seat configured and arranged for freely supporting a tone arm whereby a tone arm may be placed on and removed from the performance seat without frictional engagement of the tone arm to the holder. The tone arm is freely movable between the performance seat at a first position and the lock seat at a second position by traversing across the resilient dividing member by exceeding the resilient force of the resilient dividing member.

It is, therefore, an object of the present invention to provide a tone arm holder that is efficient to use, particularly by operators, such as disc jockeys (DJs), that frequently move the tone arm between a play/performance position to a storage position and travel frequently with the turntable.

A further object of the present invention is to provide a tone arm holder where the operator can quickly rest the tone arm in place on the holder when not in use and then be able to quickly remove it from the holder for use.

Another object of the present invention to provide a tone arm holder that enables the tone arm to be quickly moved to a locked position.

A further object of the present invention is to provide a tone arm holder that enables the tone arm to be quickly moved between a locked and unlocked condition on the holder.

Yet another object is to provide a tone arm holder that enables easy free access to the tone arm without the lock to move the tone arm over the platter and vinyl record for use and performance.

Another object of the present invention is to provide a tone arm holder that when the tone arm is not in use, the tone arm can be easily and quickly locked to secure the tone arm during transport or in an extended non-performance condition.

A further object of the present invention is to provide locking capabilities of a tone arm holder without an undesirable locking clip which is highly susceptible to breakage.

BRIEF DESCRIPTION OF THE DRAWING FIGURES

The novel features which are characteristic of the present invention are set forth in the appended claims. However, the invention's preferred embodiments, together with further objects and attendant advantages, will be best understood by reference to the following detailed description taken in connection with the accompanying drawings in which:

DESCRIPTION OF THE INVENTION

Figure 5:
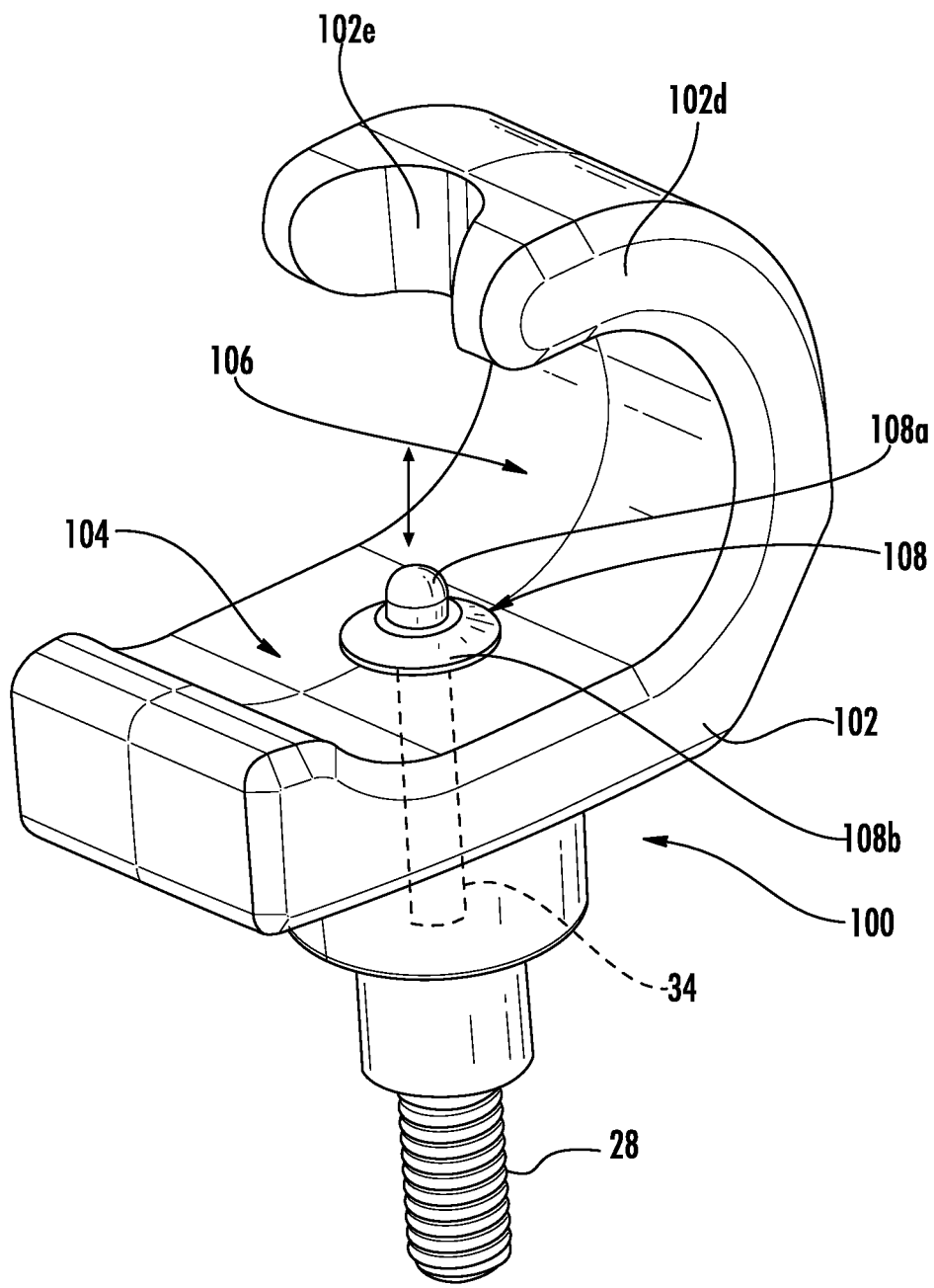
FIG. 5 is a perspective view of the tone arm holder of the present invention.
Figure 6:
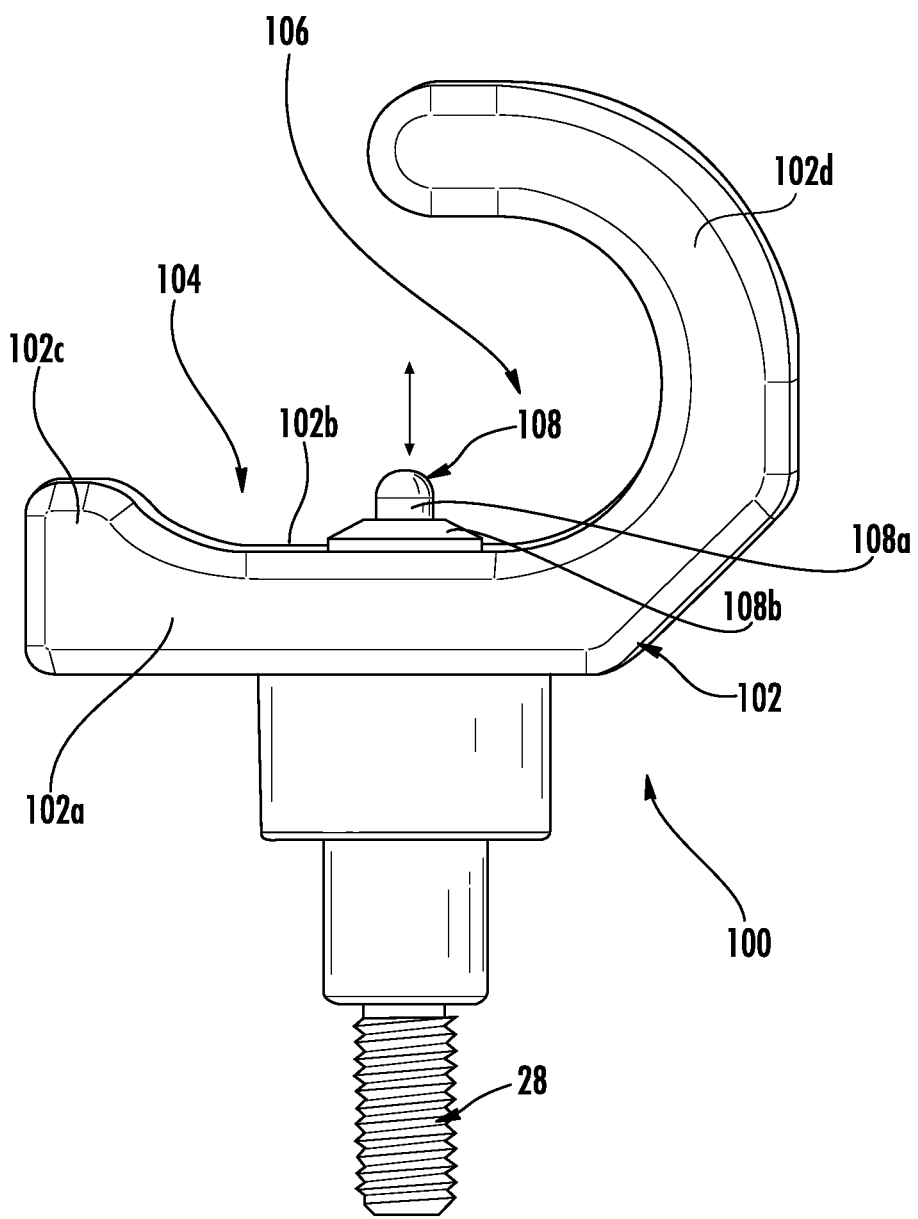
FIG. 6 is a side elevational view of the tone arm holder of FIG. 5.
Figure 7:
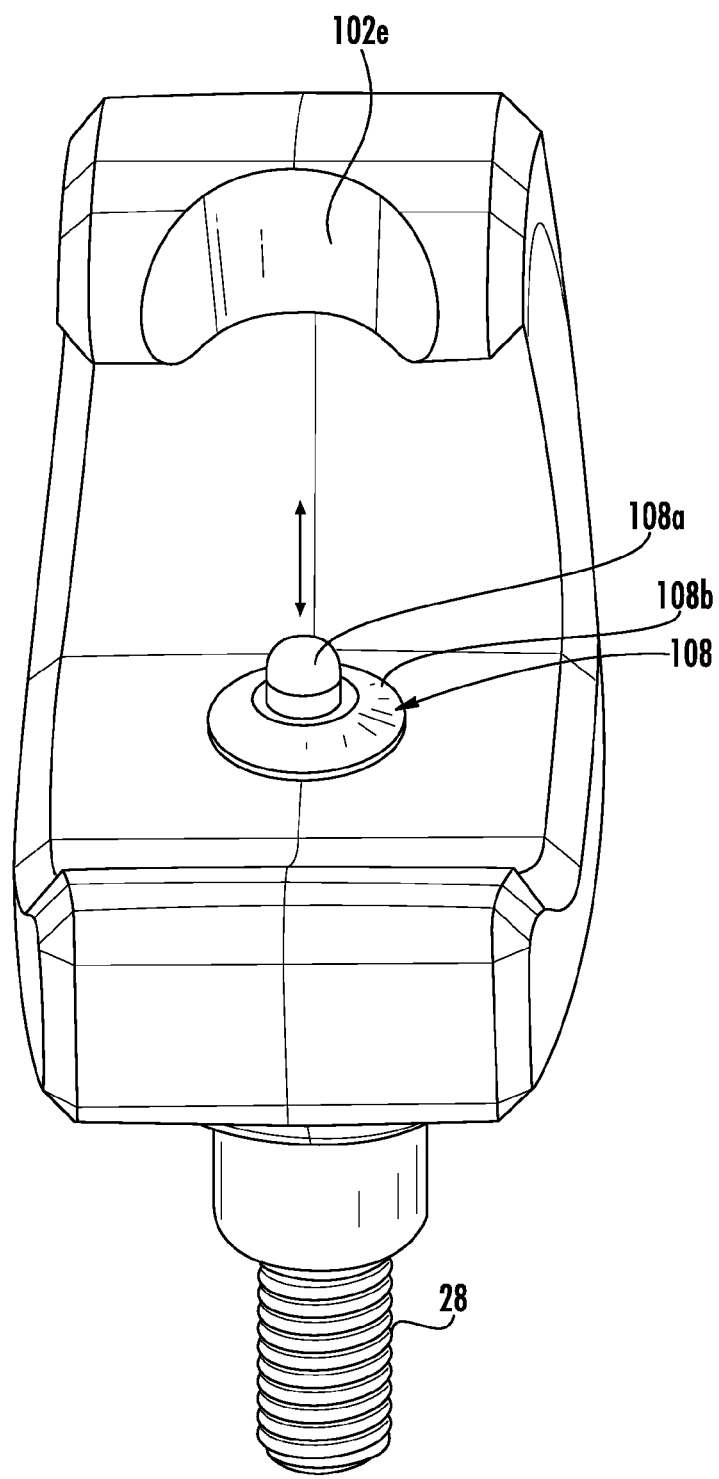
FIG. 7 is a top front perspective view of the tone arm holder of FIG. 5.

Turning first to FIGS. 5-7 various view of the tone arm holder 100 of the present invention is shown. FIG. 5 shows a front perspective view while FIG. 6 shows a right side elevational view and FIG. 7 shows a front perspective view of the inventive new tone arm holder 100. The tone arm holder 100 of the present invention includes a saddle 102 with a dual seat position having a first seat position 104 and a second seat position 106. The saddle 102 includes a base support portion 102a with a top surface 106b. The left edge 102c of the saddle 102 is upwardly curved while the right edge thereof extends to a hook-like structure 102d. Disposed substantially in the middle of the saddle 102 is a resilient member, 108 which is preferably in the form of a ball-spring plunger. While ball-spring plunger is preferred, any type of resilient member 108 may be employed for this purpose, such as a compressible rubber member or other type spring. This resilient member 108 effectively divides the saddle 102 into two separate seat positions 104, 106 in which a tone arm 14 may reside and be held. The resilient member 108 assists in retaining the tone arm 14 in either one of the two seat positions 104, 106 while permitting the tone arm 14 to freely move between the two seat positions 104, 106 by merely overcoming the resilient/spring forces of the resilient member 108.

Therefore, the present invention is a significant improvement over the prior art by providing a new configuration for a tone arm holder 100. The first seat position 104 of the inventive tone arm holder 100 (shown on the left in FIG. 6) allows for the operator to rest the tone arm 14 and have it easily accessible for movement, use and performance. The second seat position 106 (shown on the right in FIG. 6), provides a deeper position to effectively lock the tone arm 14 in the curve of the hook portion 102d of the saddle portion 102 tone arm holder 100 with the assistance of the ball-spring plunger 108. This second seat position 106 provides a tight lock of the tone arm 14 to the body of the turntable 24 to immobilize the tone arm for safe transport or storage. The tone arm holder 100 of the present invention is preferably made of metal to provide a much stronger and more durable tone arm holder 100 than the prior art tone arm holders, which are typically made of plastic.

Figure 8:
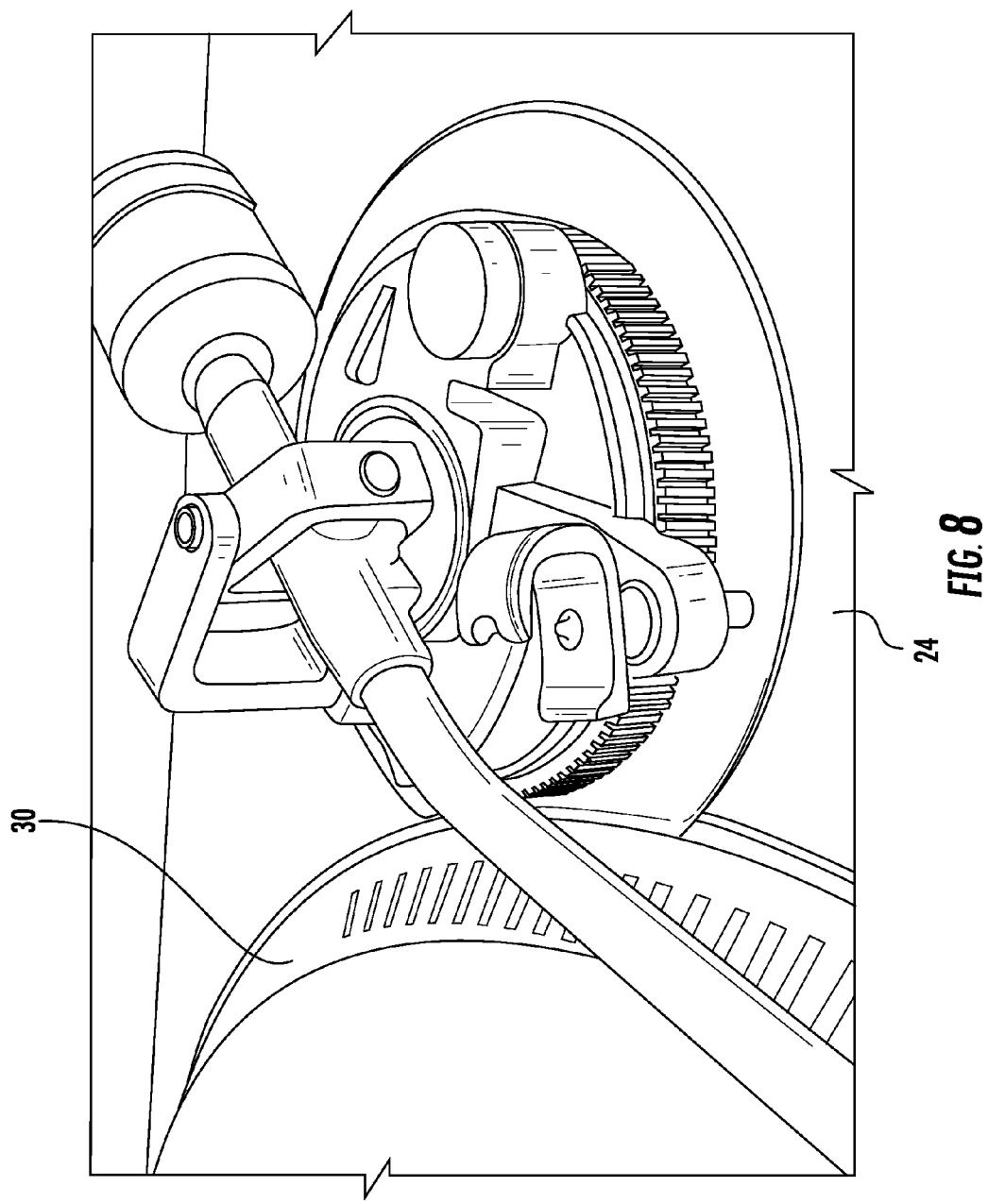
FIG. 8 is a front perspective view of the tone arm holder of FIG. 5 during performance use of the turntable and tone arm.

Referring now to FIGS. 8-14, details of the tone arm holder 100 in use is shown and described. Turning first to FIG. 8, the tone arm holder 100 of the present invention is shown secured to a turntable 24, namely, a tone arm base 26 which is fixed relative to the pivoting tone arm 14 itself, such as in a threaded hole 32 in a component of the tone arm base 26. Preferably, the tone arm holder 100 is secured to the turntable 24 by threaded engagement of a male threaded post 28, as in FIGS. 5-7, into a female threaded aperture (not shows) on the tone arm base 26. The tone arm 14 is shown out of the tone arm holder 100 representative of being in use for a performance. The tone arm holder 100 of the present invention has its saddle 102 and configured and arranged with the open end of the hook portion 102d facing the rotating platter 30 of the turntable 24 which is the direction from which the tone arm 14 itself will enter the tone arm holder 100.

Figure 1:
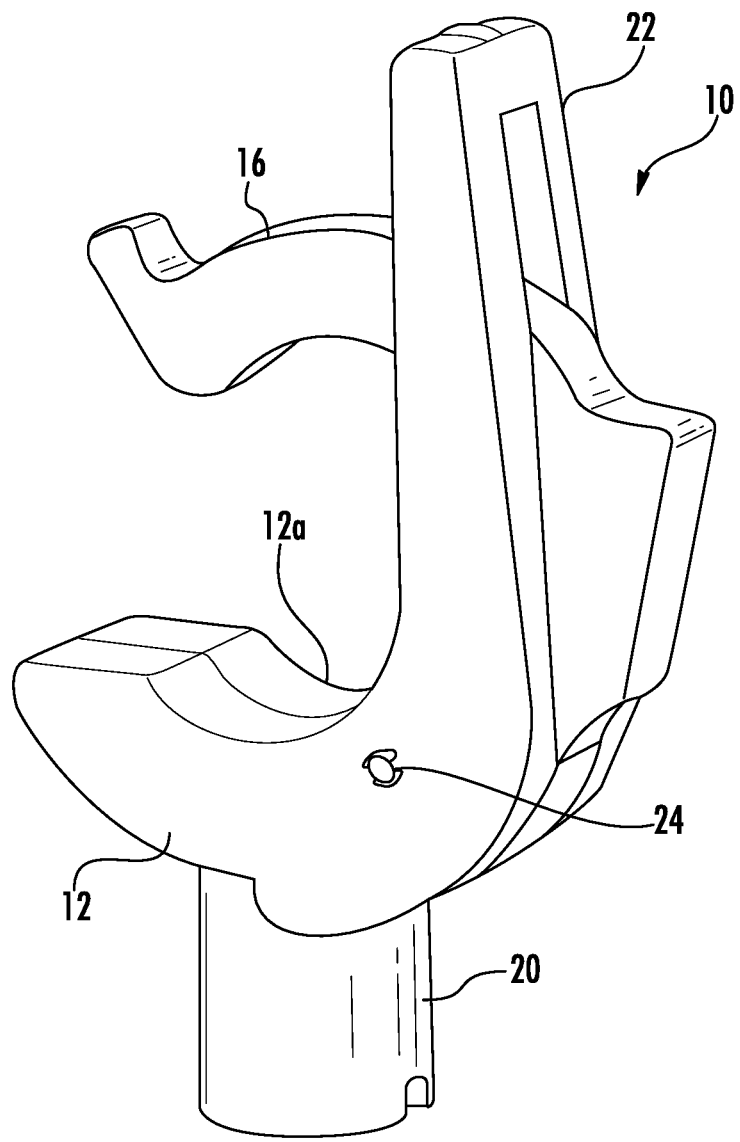
FIG. 1 shows a perspective view of a prior art tone arm holder with pivoting locking clip.
Figure 2:
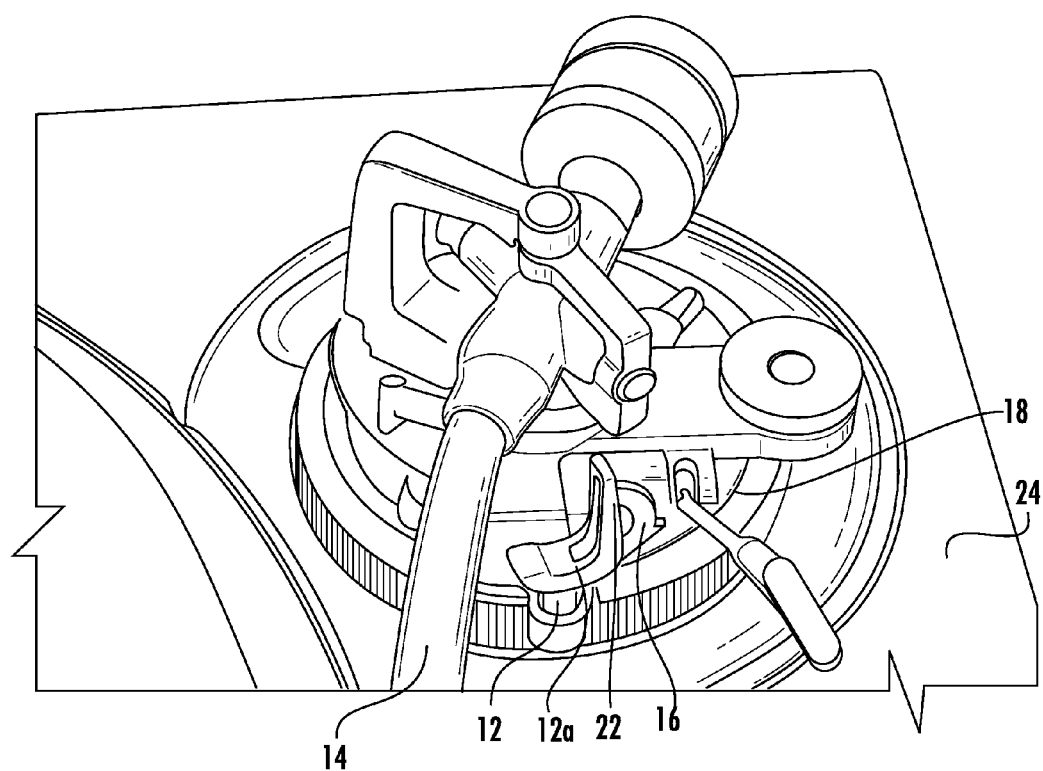
FIG. 2 shows a perspective view of the prior art tone arm holder with pivoting locking clip in an open condition during use and performance of the tone arm.
Figure 3:
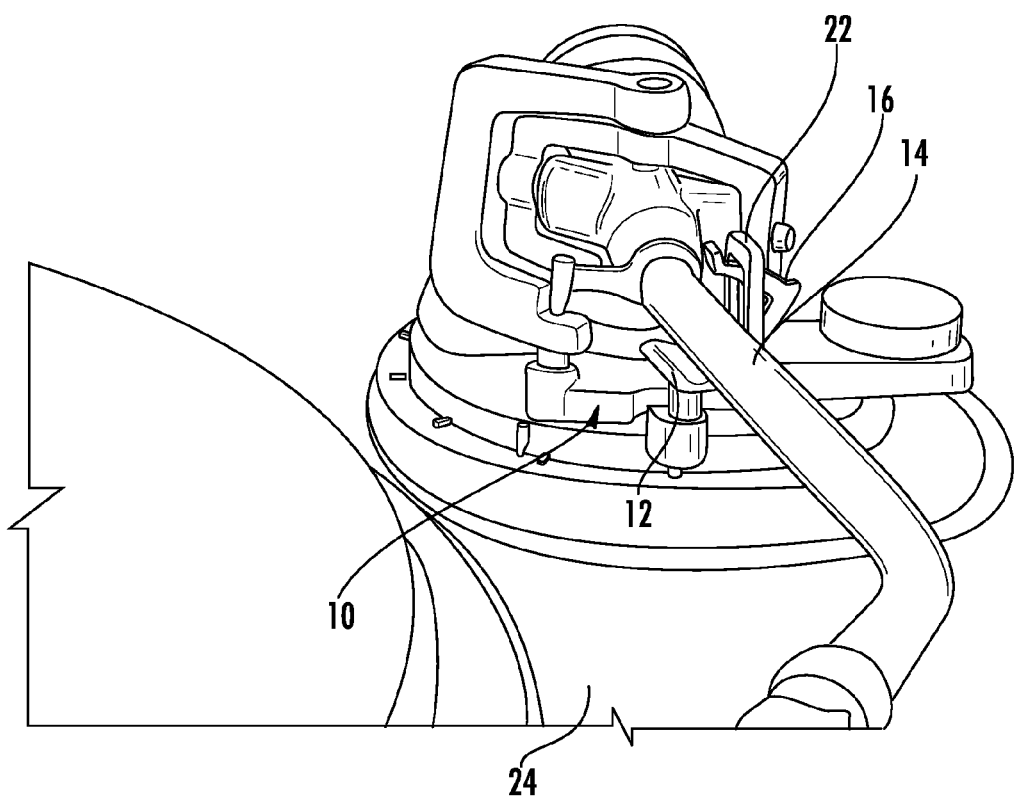
FIG. 3 shows a perspective view of the prior art tone arm clip of FIG. 1 installed on a turntable with a tone arm unlocked without the clip engaged for use of the turntable for performance.
Figure 4:
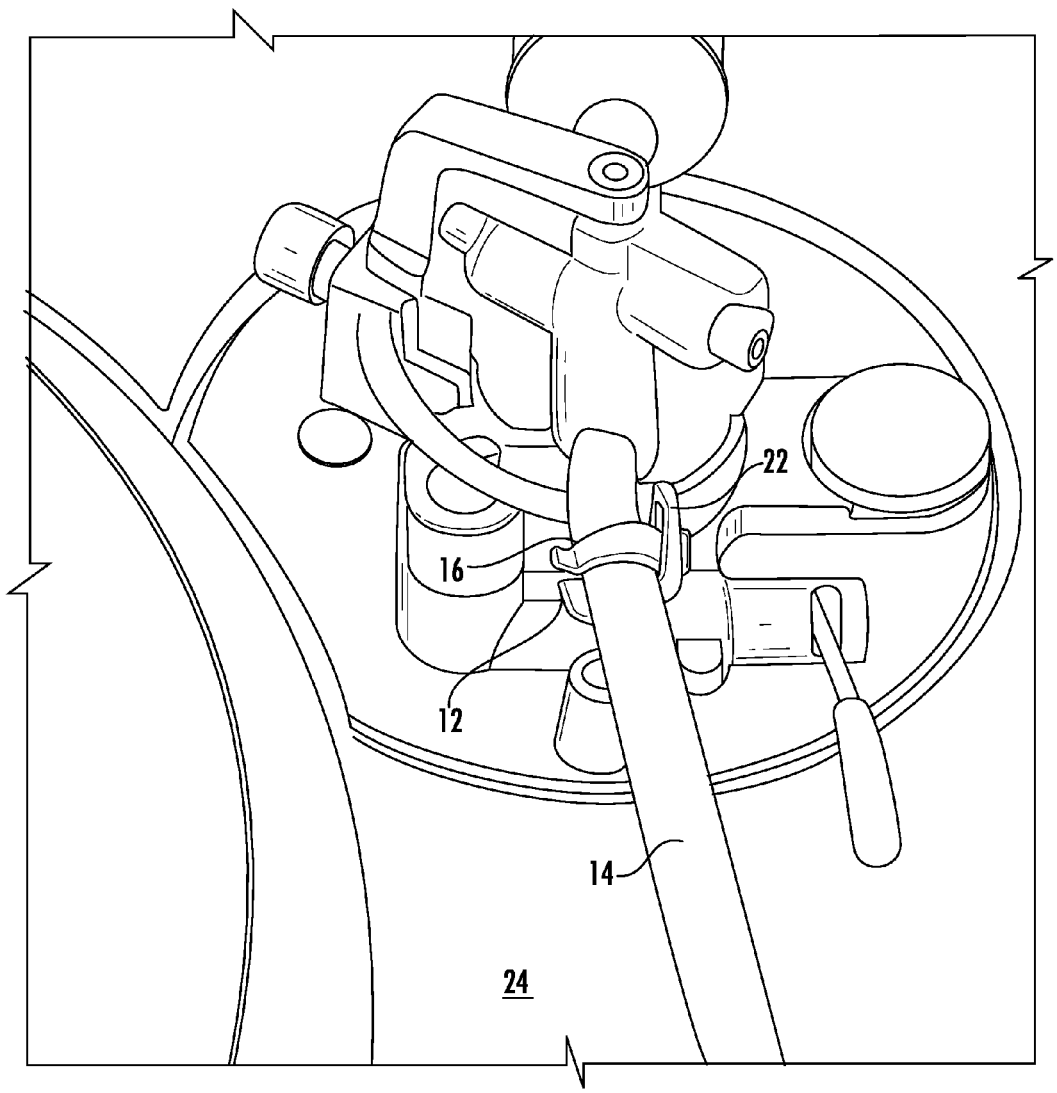
FIG. 4 shows a perspective view of the prior art tone arm clip of FIG. 1 installed on a turntable with a tone arm locked therein using the pivoting locking clip for transport and storage of the turntable when not in use.
Figure 9:
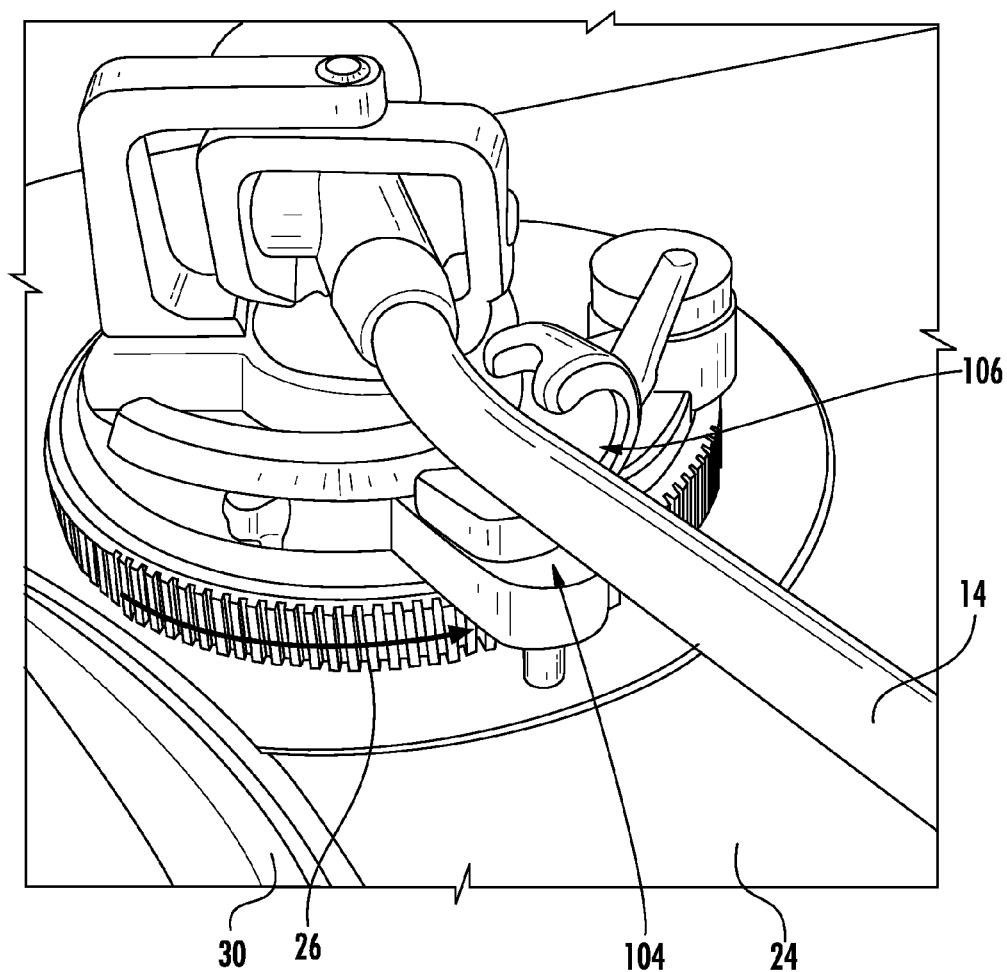
FIG. 9 is a front perspective view of the tone arm holder of FIG. 5 with the tone arm in a resting unlocked position ready for use.
Figure 10:
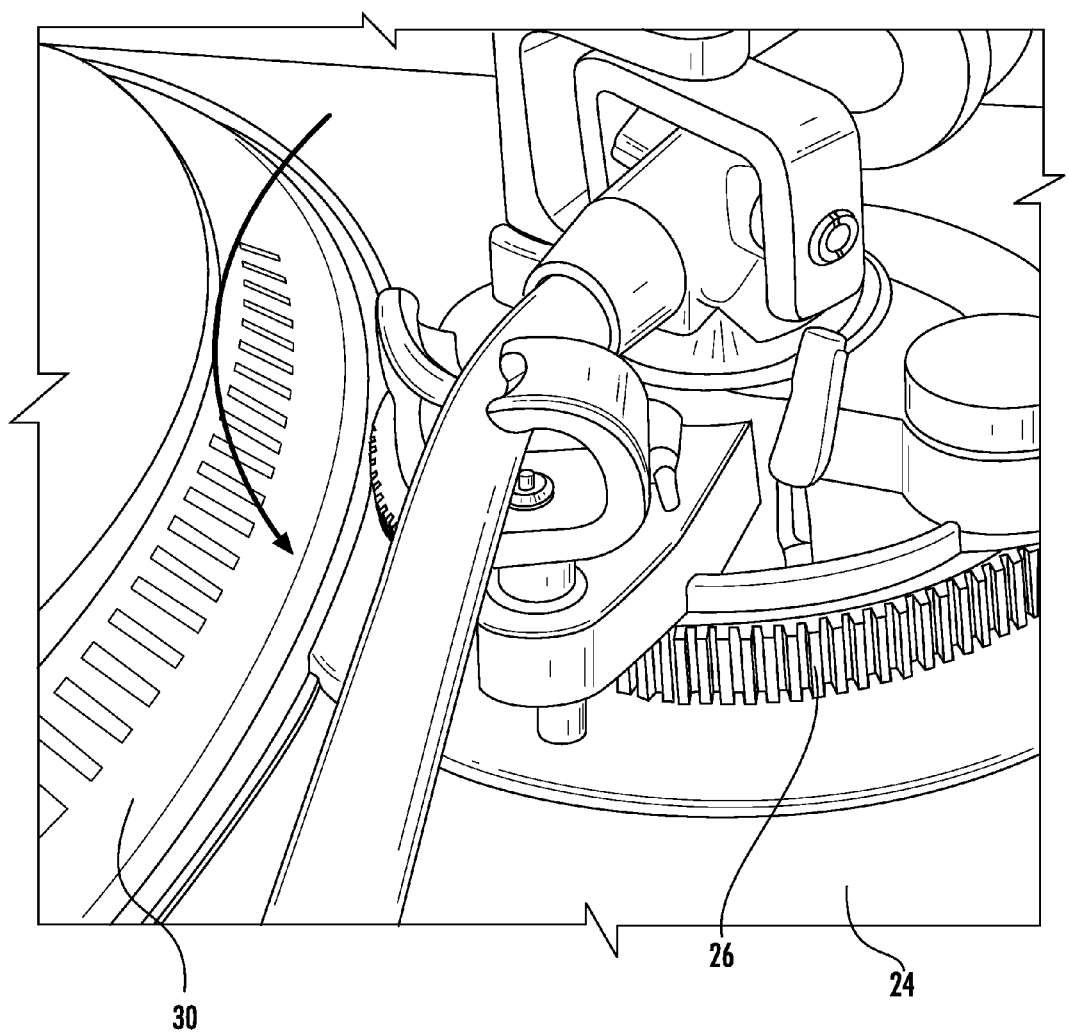
FIG. 10 is a reverse perspective view of the tone arm in a resting unlocked position shown in FIG. 9.

FIGS. 9 and 10 show the pivoting of the tone arm 14 from a use and performance position to the first seat position 104 of the dual seat saddle 102 of the tone arm holder 100 of the present invention. FIG. 9 shows a front perspective view while FIG. 10 shows a reverse perspective view of the tone arm 14 residing and resting in the first seat position 104. In this position, the tone arm 14 can be freely rested on the first seat 104 of the tone arm saddle 102 because there is no locking in this position. As a result, the tone arm 14 can be easily rested on the tone arm holder 100 in similar fashion to a prior art tone arm holder 10, such as that shown in FIG. 2. In this resting position 104, the tone arm 14 rests on the first seat portion of the saddle 102 and is bounded on one side by a ramped portion 102c and on the other side by the resilient member 105. In this resting position in the first seat 104, gravity maintains the tone arm 14 in place.

Figure 11:
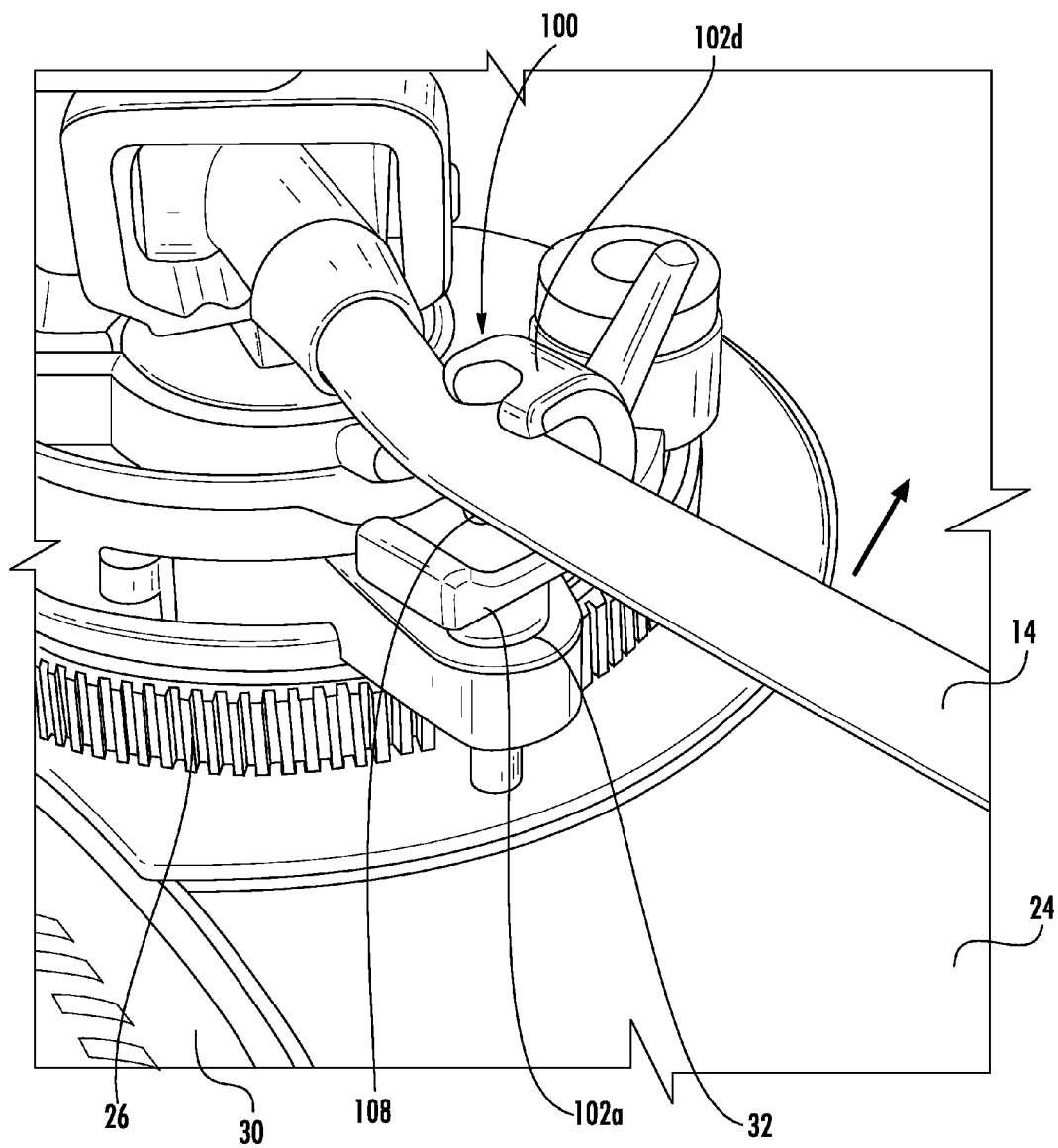
FIG. 11 is a perspective view showing the transition of the tone arm from the resting unlocked position of the saddle to the locked storage position of the saddle.
Figure 12:
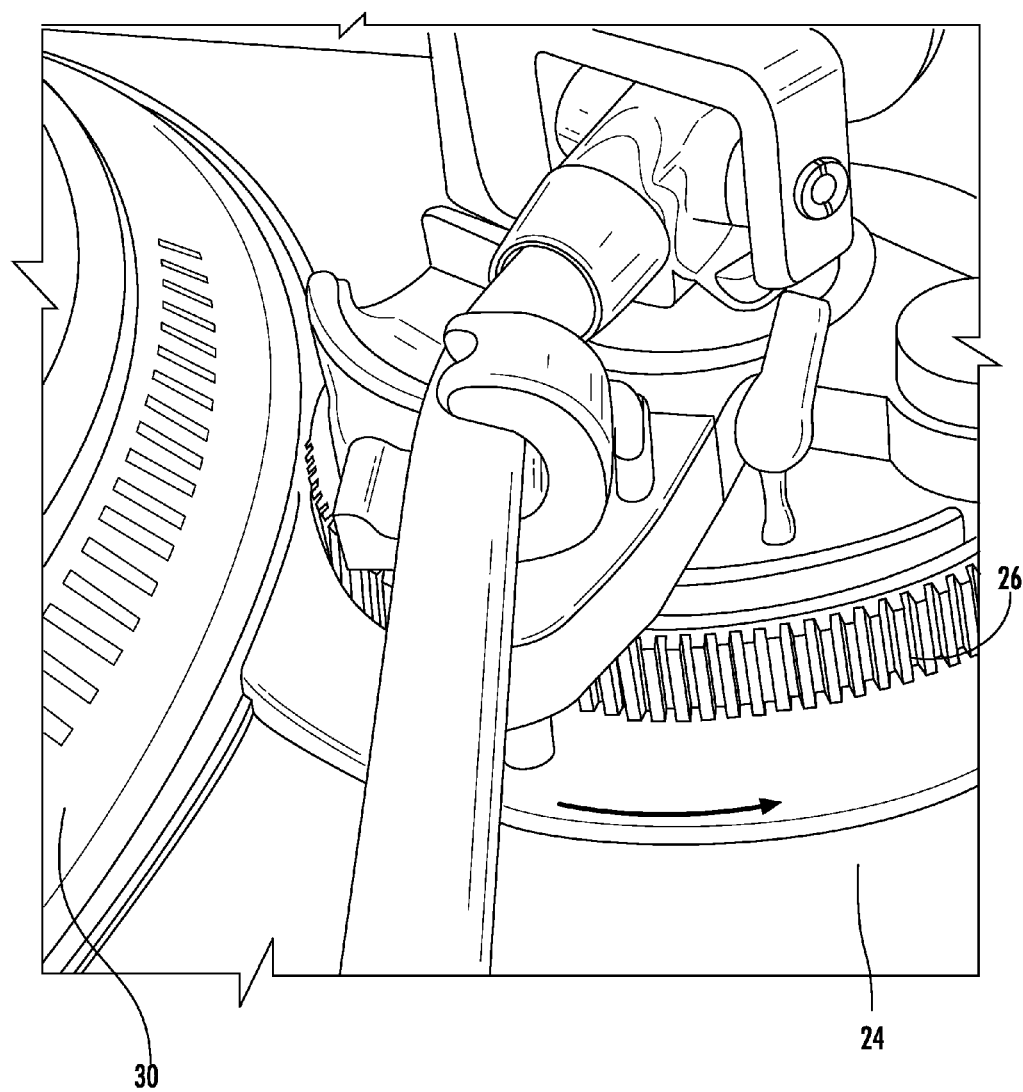
FIG. 12 is a reverse perspective view of the tone arm in transition from a resting unlocked position to a locked storage position, as shown in FIG. 11.

When an operator is finished performing or the turntable 24 is no longer in use, it is highly desirable to lock the tone arm 14 relative to the turntable 24 itself, as is well known in the field, to prevent damage to the tone arm 14 during non-use and transport of the turntable 24. FIGS. 11 and 12 show the transition of the tone arm 14 from the first seat 104 (open and freely resting) to a second seat 106 for secure locking of the tone arm 14 relative to the turntable 24. FIG. 11 shows a front perspective view and FIG. 12 shows a reverse perspective view of the tone arm 14 traversing the resilient member 108 that resides in the substantial center portion of the dual seat saddle 102. In this position, the tone arm 14 is further pivoting away from the platter 30 in the direction of the arrow from the first seat 104 to the second seat 106. To traverse across the resilient member 108, the tone arm 14 is pivoted in the direction of the arrow with enough force to compress the resilient member 108, namely, to compress the ball 108a of the ball-spring plunger member 108 against the spring forces therein so the ball 108a clears out of the way. FIGS. 11 and 12 show the act of pivoting the tone arm 14 with this sufficient force to permit the tone arm 14 to travel past the resilient member 108 that is acting a dividing type member.

As noted above, the resilient member 108 is preferably a ball-spring plunger but can be any type of resilient member 108. A typical ball-spring plunger is typically a ball 108a that is captured within a tubular sheath 108b and spring-biased to the top of the sheath 108b by a spring, such as a coil or compression spring (not shown). Construction of such ball-spring plungers 108 are so well-known in the art that they need not be discussed in further detail herein. The ball-spring plunger 108 is preferably installed in a hole 34 in the saddle 102 and secured in place, as seen in FIG. 5. The tension of the resilient member 108 can be provided to suit the amount of pivoting force required to move the tone arm 14 past the resilient member 108. For example, if the resilient member 108 is a ball-spring plunger, the force can be adjusted by changing the compression force of the spring used in the ball-spring plunger 108.

Figure 13:
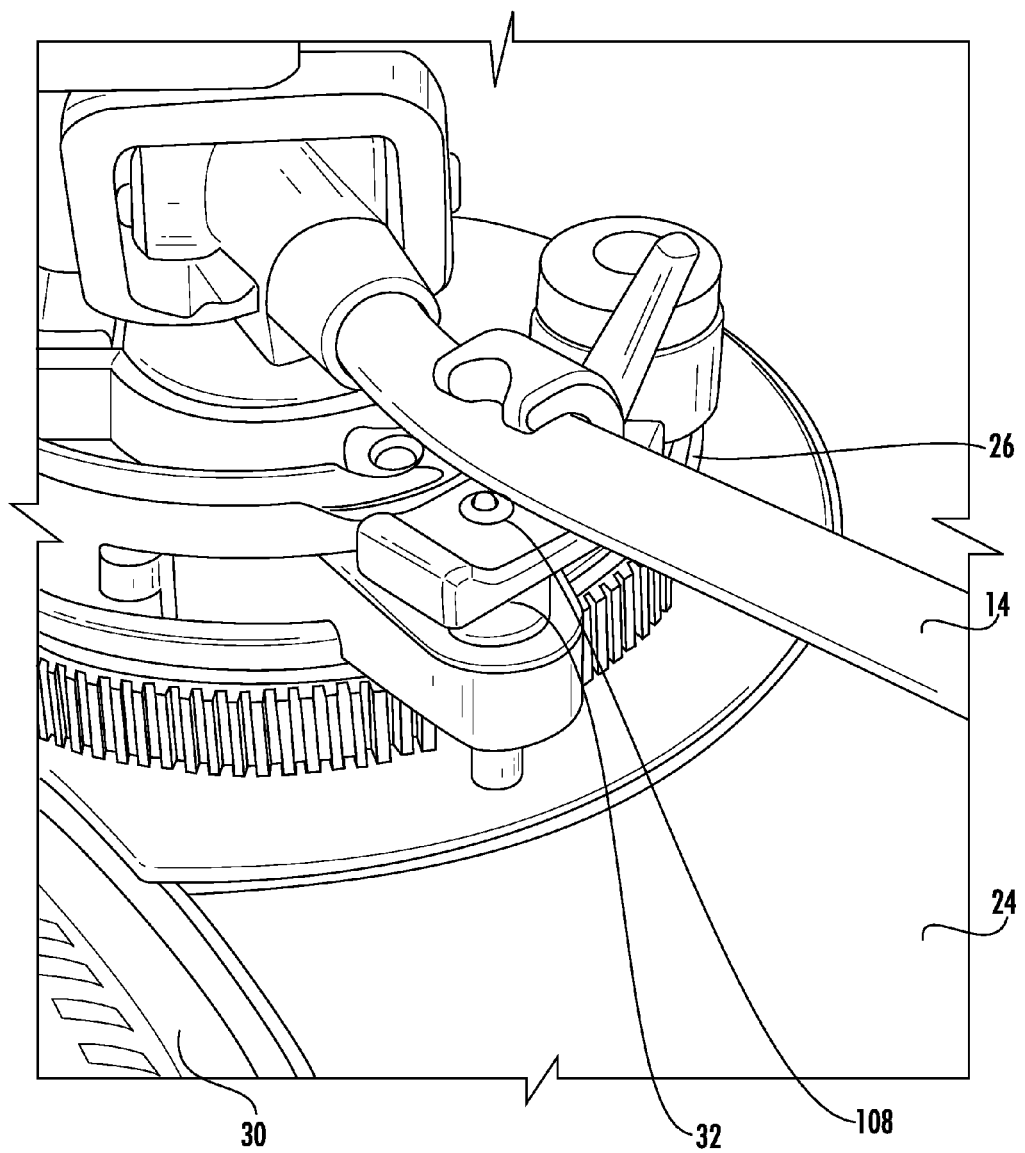
FIG. 13 is a perspective view of the tone arm clip of the present invention of FIG. 5 with the tone arm residing in a locked storage position of the saddle.
Figure 14:
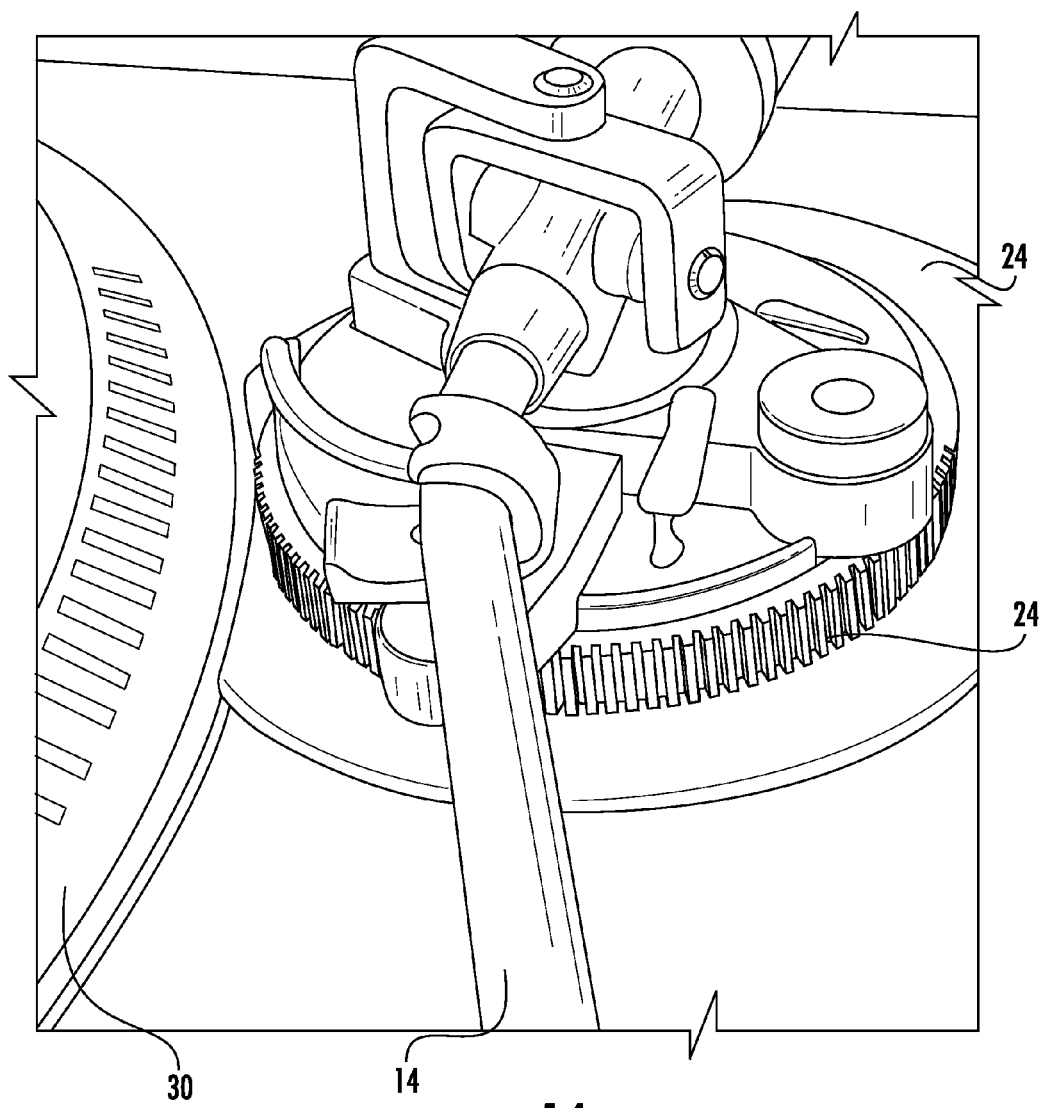
FIG. 14 is a reverse perspective view of the tone arm clip of the present invention of FIG. 5 with the tone residing in a locked storage position of the saddle, as shown in FIG. 13.

Once the tone arm 14 is rotated into the tone arm holder 100 further and with enough force to traverse the resilient member 108, the tone arm 14 will securely lock into place in the second seat 106 that is defined by the resilient member 108 and the hook portion 102d of the saddle 102. FIGS. 13 and 14 show the tone arm 14 after it has pivotally overcome the forces of the resilient member 108 and has been secured in the locked second seat position 106. FIG. 13 shows a front perspective view while FIG. 14 shows a reverse perspective view. As can be seen, the tone arm 14 is captured by the hook portion 102d of the saddle 102 and is prevented from leaving that position by the resilient forces of the resilient member 108, namely, the spring forces of the ball-spring plunger 108. The tension of the resilient member 108 is sufficient so that the tone arm 14 is not ejected from the seat position 106 of the saddle 102 during typical movement that might be experienced during transport. Thus, in this locked second seat position 106, the tone arm 14 in securely frictionally secured in place without the use of additional pivoting clip members.

A cut-out 102e may be provided at the free end of the hook portion 102d of the saddle 102. This can help urge the tone arm 14 into the locked second seat position 106 with the assistance of the operator's fingers by pressing the tone arm 14 at the location of the tone arm holder 100.

With the tone arm 14 locked in place, as in FIGS. 13 and 14, the tone arm 14 will remain in the second seat 106 until it is ready for use and performance. When the turntable 24 is ready to be used again, the tone arm 14 is rotated in the reverse direction, as that shown in FIGS. 11 and 12, so that the tone arm 14 moves from the locked second seat position 106 back to the resting/use first seat position 104. Again, sufficient pivoting force must be provided to traverse the tone arm 14 over the ball-spring plunger 108 with sufficient force to compress the ball 108a to clear it out of the way so the tone arm 14 may pass from the second seat 106 on into the first seat 104. Once the tone arm 14 clears the resilient member 18, it can be rested on the first seat 104, as in FIGS. 9 and 10 in preparation for use and performance.

In view of the above, an improved tone arm holder with a saddle 102 with a dual/two seat position 104, 106, where the tone arm 14 can easily move from a resting/use position to a locked position is provided without the use of a delicate pivoting clip member that tends to break. As a result, the tone arm holder 100 of the present invention operates in a superior fashion to prior art tone arm holders as is more durable than such prior art tone arm holders.

It would be appreciated by those skilled in the art that various changes and modifications can be made to the illustrated embodiments without departing from the spirit of the present invention. All such modifications and changes are intended to be covered by the appended claims.

What is claimed is:
1. A tone arm holder, comprising:
a saddle having a top surface and a first side edge and a second side edge;
a hook member with two ends, one of the ends being connected to the second side edge of the saddle; the hook member defining an open end facing the first side edge of the saddle;
a resilient dividing member, having a resilient force, located on the top surface of the saddle and positioned between the first side edge and second side edge of the saddle;
the resilient dividing member, a portion of the saddle between the resilient dividing member and the second side edge and the hook member defining a lock seat configured and arranged for frictional engagement, receipt and storage of a tone arm therein;
the resilient dividing member, a portion of the saddle between the resilient dividing member and the first side edge of the saddle defining a performance seat configured and arranged for freely supporting a tone arm whereby a tone arm may be placed on and removed from the performance seat without frictional engagement of the tone arm to the holder;
whereby a tone arm is freely movable between the performance seat at a first position and the lock seat at a second position by traversing across the resilient dividing member by exceeding the resilient force of the resilient dividing member.

2. The tone arm holder of claim 1, wherein the resilient dividing member is a ball-spring plunger.

3. The tone arm holder of claim 1, wherein the first side edge of the saddle is upwardly curved.

4. The tone arm holder of claim 1, wherein the saddle and hook member are integrally formed.

5. The tone arm holder of claim 1, wherein the saddle and hook member are made of metal.

6. The tone arm holder of claim 1, wherein a tone arm is pivotally moved between the performance seat at the first position and the lock seat at the second position.

* * * * *